(12) United States Patent
Hausman (10) Patent No.: US 6,370,121 B1
(45) Date of Patent: *Apr. 9, 2002

(54) METHOD AND SYSTEM FOR SHORTCUT TRUNKING OF LAN BRIDGES

(75) Inventor: Richard Hausman, Soquel, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,023

(22) Filed: Jun. 29, 1998

(51) Int. Cl.[7] .............................................. H04L 12/28
(52) U.S. Cl. ....................................... 370/256; 370/401
(58) Field of Search ............................... 370/241, 248, 370/252, 400, 401–2, 254, 256

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |

(List continued on next page.)

FOREIGN PATENT DOCUMENTS

| | | |
|---|---|---|
| EP | 0 384 758 A2 | 8/1990 |
| EP | 0 431 751 A1 | 6/1991 |
| EP | 0 567 217 A2 | 10/1993 |
| WO | WO93/07569 | 4/1993 |
| WO | WO93/07692 | 4/1993 |
| WO | WO94/01828 | 1/1994 |
| WO | WO95/20850 | 8/1995 |

OTHER PUBLICATIONS

William Stallings, Data and Computer Communications, pp. 329–333, Prentice Hall, Upper Saddle River, New Jersey 07458.

(List continued on next page.)

*Primary Examiner*—David R. Vincent
(74) *Attorney, Agent, or Firm*—Swernofsky Law Group PC (57) ABSTRACT

The invention provides a method and system for routing traffic between LAN bridges. A method and system for enabling a blocked link to allow forwarding of traffic across the blocked link includes determining whether the blocked link is a point-to-point connection between two bridges, each one of the two bridges having a plurality of ports, ascertaining whether each one of the two bridges operates a Shortcut Trunking Exchange protocol, and calculating whether on at least one of the two bridges, a port cost of the blocked link is equal to or lower than a port cost of each other one of the plurality of ports. In addition, a method for selecting traffic to forward on a blocked link, the traffic having a source and a destination address, includes building an outside address list for a first bridge, the outside address list including each address "outside" the first bridge, building an outside address list for a second bridge, the outside address list including each address "outside" the second bridge, determining that the source and destination addresses are both "outside" the first and second bridges using the outside address lists for the first and second bridges, and forwarding the traffic if the traffic is unicast traffic when the source and destination addresses are both "outside" the first and second bridges.

29 Claims, 5 Drawing Sheets

U.S. PATENT DOCUMENTS

| | | |
|---|---|---|
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,304 A | 1/1990 | Giacopelli et al. |
| 4,893,306 A | 1/1990 | Chao et al. |
| 4,903,261 A | 2/1990 | Baran et al. |
| 4,905,233 A | 2/1990 | Cain et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,772 A | 10/1990 | Daniel et al. |
| 4,970,678 A | 11/1990 | Sladowski et al. |
| 4,979,118 A | 12/1990 | Kheradpir ................ 364/436 |
| 4,980,897 A | 12/1990 | Decker et al. |
| 4,991,169 A | 2/1991 | Davis et al. |
| 4,996,685 A | 2/1991 | Farese et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,051,987 A | 9/1991 | Conlon |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,115,495 A | 5/1992 | Tsuchiya et al. |
| 5,128,926 A | 7/1992 | Perlman et al. |
| 5,128,945 A | 7/1992 | Enns et al. |
| 5,136,580 A | 8/1992 | Videlock et al. |
| 5,166,930 A | 11/1992 | Braff et al. |
| 5,189,662 A | 2/1993 | Kleine-Altekamp |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,231,633 A | 7/1993 | Hluchyj et al. |
| 5,233,604 A | 8/1993 | Ahmadi et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,249,292 A | 9/1993 | Chiappa |
| 5,251,205 A | 10/1993 | Callon et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. .......... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,325,358 A | 6/1994 | Goeldner |
| 5,327,421 A | 7/1994 | Hiller et al. |
| 5,331,637 A | 7/1994 | Francis et al. |
| 5,335,224 A | 8/1994 | Cole et al. |
| 5,345,445 A | 9/1994 | Hiller et al. |
| 5,345,446 A | 9/1994 | Hiller et al. |
| 5,353,283 A | 10/1994 | Tsuchiya |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,426,637 A | 6/1995 | Derby et al. |
| 5,428,607 A | 6/1995 | Hiller et al. |
| 5,430,715 A | 7/1995 | Corbalis et al. |
| 5,430,729 A | 7/1995 | Rahnema |
| 5,432,784 A | 7/1995 | Ozveren |
| 5,442,457 A | 8/1995 | Najafi |
| 5,442,624 A | 8/1995 | Bonomi et al. |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,485,455 A | 1/1996 | Dobbins et al. |
| 5,490,140 A | 2/1996 | Abensour et al. |
| 5,490,258 A | 2/1996 | Fenner |
| 5,491,687 A | 2/1996 | Christensen et al. |
| 5,491,693 A | 2/1996 | Britton et al. |

| | | |
|---|---|---|
| 5,491,804 A | 2/1996 | Heath et al. |
| 5,497,368 A | 3/1996 | Reijnierse et al. |
| 5,504,747 A | 4/1996 | Sweasey |
| 5,509,006 A | 4/1996 | Wilford et al. |
| 5,517,494 A | 5/1996 | Green |
| 5,517,617 A | 5/1996 | Sathaye et al. |
| 5,517,620 A | 5/1996 | Hashimoto et al. |
| 5,519,704 A | 5/1996 | Farinacci et al. |
| 5,519,858 A | 5/1996 | Walton et al. ............. 395/600 |
| 5,524,254 A | 6/1996 | Morgan et al. |
| 5,526,489 A | 6/1996 | Nilakantan et al. |
| 5,530,963 A | 6/1996 | Moore et al. |
| 5,535,195 A | 7/1996 | Lee |
| 5,535,338 A | 7/1996 | Krause et al. |
| 5,539,734 A | 7/1996 | Burwell et al. |
| 5,541,911 A | 7/1996 | Nilakantan et al. |
| 5,546,370 A | 8/1996 | Ishikawa |
| 5,550,816 A | 8/1996 | Hardwick et al. |
| 5,555,244 A | 9/1996 | Gupta et al. |
| 5,561,669 A | 10/1996 | Lenney et al. |
| 5,577,105 A | 11/1996 | Baum et al. |
| 5,583,862 A | 12/1996 | Callon |
| 5,586,121 A | 12/1996 | Mourn et al. |
| 5,592,470 A | 1/1997 | Rudrapatna et al. |
| 5,596,574 A | 1/1997 | Perlman et al. |
| 5,598,581 A | 1/1997 | Daines et al. |
| 5,600,798 A | 2/1997 | Chenrukuri et al. |
| 5,604,868 A | 2/1997 | Komine et al. |
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |
| 5,632,021 A | 5/1997 | Jennings et al. |
| 5,634,010 A | 5/1997 | Ciscon et al. |
| 5,634,011 A | 5/1997 | Auerbach et al. |
| 5,638,359 A | 6/1997 | Peltola et al. |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. |
| 5,684,797 A | 11/1997 | Aznar et al. ............... 370/390 |
| 5,684,954 A | 11/1997 | Kaiserswerth et al. |
| 5,687,324 A | 11/1997 | Green et al. |
| 5,689,506 A | 11/1997 | Chiussi et al. ............. 370/388 |
| 5,694,390 A | 12/1997 | Yamato et al. |
| 5,724,351 A | 3/1998 | Chao et al. |
| 5,740,157 A | 4/1998 | Demiray et al. |
| 5,742,760 A | 4/1998 | Picazo, jr. et al. |
| 5,742,905 A | 4/1998 | Pepe et al. |
| 5,748,186 A | 5/1998 | Raman |
| 5,748,617 A | 5/1998 | McLain, Jr. |
| 5,751,971 A | 5/1998 | Dobbins et al. |
| 5,754,547 A | 5/1998 | Nakazawa |
| 5,774,698 A | 6/1998 | Olnowich |
| 5,802,054 A | 9/1998 | Bellenger |
| 5,835,710 A | 11/1998 | Nagami et al. |
| 5,854,903 A | 12/1998 | Morrison et al. |
| 5,856,981 A | 1/1999 | Voelker |
| 5,892,924 A | 4/1999 | Lyon et al. ............ 395/200.75 |
| 5,898,686 A | 4/1999 | Virgile |
| 5,898,687 A | 4/1999 | Harriman et al. |
| 5,903,559 A | 5/1999 | Acharya et al. |
| 5,905,723 A | 5/1999 | Varghese et al. |
| 5,914,953 A | 6/1999 | Krause et al. |
| 5,959,968 A * | 9/1999 | Chin et al. .................. 370/216 |
| 5,991,817 A | 11/1999 | Rowett et al. |
| 6,023,733 A | 2/2000 | Periasamy et al. |
| 6,032,194 A * | 2/2000 | Gai et al. .................... 709/239 |
| 6,035,105 A | 3/2000 | McCloghrie et al. |
| 6,078,590 A | 6/2000 | Farinacci et al. |
| 6,081,512 A * | 6/2000 | Muller et al. ............... 370/256 |
| 6,097,718 A | 8/2000 | Bion |
| 6,111,877 A | 8/2000 | Wilford et al. |
| 6,122,272 A | 9/2000 | Tomaszewski et al. |
| 6,157,641 A | 12/2000 | Wilford |
| 6,219,739 B1 * | 4/2001 | Dutt et al. .................. 710/129 |

OTHER PUBLICATIONS

Allen, M., "Novell IPX Over Various WAN Media (IPXWAN)," Network Working Group, RFC 1551, Dec. 1993, pp. 1–22.

Becker, D., "3c589.c: A 3c589 EtherLink3 ethernet driver for linux," becker≡CESDIS.gsfc.nasa.gov, May 3, 1994, pp. 1–13.

Chowdhury, et al., "Alternative Bandwidth Allocation Algorithms for Packet Video in ATM Networks," INFOCOM 1992, PP. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–Contiguous Wildcarding," Abstract, Bellcore.

Zhang, et al., "Rate–Controlled Static–Priority Queueing," INFOCOM 1993, pp. 227–236.

ATM Forum Technical Committee. "Fault Tolerant for point–to–Multipoint connections in PNNI". Jul. 20–25, 1997. Montreal, Quebec, Canada.

Frame Relay Documentation. Copyright 1989–1999, Cisco Systems, Inc., Posted Tue Sep. 21, 1999.

Nick McKeown et al. "The Bay Bridge: A High Speed Bridge/Router". Presented at IFIP PFHSN Workshop, Stockholm, Swede, May 1992.

Nick McKeown et al. Architecture and Performance of The Bay Bridge: A High Speed Bridge/Router Between FDDI and SMDS. Project Report: 13 Revision: 2.0 Dept. of EE, University of California at Berkeley.

Nick McKeown and Fouad Tobagi. "Bridges, Routers and Switches". Dept. of EE, Standford University, Standford, California.

* cited by examiner

METHOD AND SYSTEM FOR SHORTCUT TRUNKING OF LAN BRIDGES

BACKGROUND OF THE INVENTION

1. Field of the Invention

The present invention relates to routing traffic between LAN bridges.

2. The Prior Art

Local area networks (LANs) are typically configured using a plurality of interconnected multi-port bridges. Through the use of these interconnected bridges, a potential exists that a "loop" will form, in which traffic will flow endlessly. To avoid this problem, human operators may verify that no loops are created when these bridges are connected. However, to reduce the potential for human error and to simplify this verification process, some networks use a Spanning Tree Protocol (STP).

The Spanning Tree Protocol is a topology reduction technique which consists of two steps. First, a "root" bridge is selected which is logically made the center of the network. Second, each remaining bridge determines through which of its ports lies the optimal path to the root. This optimal path is determined according to static path costs. Ports which lead to the root, but which are not optimal, are blocked, thus eliminating all loops. All remaining ports remain active, allowing forwarding of traffic on these connections. Thus, a "spanning tree" is created in which every pair of points in the network is connected via one, and only one unblocked path.

Although the Spanning Tree Protocol is in wide use today, the protocol has several distinct disadvantages. First, in response to a topology change in the network, the Spanning Tree Protocol must perform a reconfiguration, negotiating among all participating devices to determine which ports to block. This process can last approximately 30–60 seconds for an ordinary sized network. During this time, newly active ports are not yet enabled for forwarding. As a result, protocol timeouts may occur before a new link is enabled. Moreover, learned addresses are quickly discarded during the reconfiguration, to be relearned appropriate to the new topology. Flooding of unknown destination traffic before a new link is established or prior to relearning can substantially decrease the performance of the network. Second, the Spanning Tree Protocol, in eliminating loops, creates a number of blocked ports. Since these blocked ports carry no traffic, the Spanning Tree Protocol substantially reduces the number of bridge connections in use. As a result, network traffic is sent along a limited number of bridge connections. Third, the Spanning Tree Protocol is designed to select an optimal path to a root bridge from each other bridge in the network, rather than selecting an optimal path between end systems. Therefore, efficiency resulting from the use of the Spanning Tree Protocol reduced topology can be far from optimal.

It would be desirable to provide a mechanism to provide for use of blocked links. Two such mechanisms exist. First, a Dynamic Load Sharing protocol is disclosed in U.S. Pat. No. 4,811,337. Second, a Generalized Dynamic Load Sharing protocol is disclosed in U.S. Pat. No. 5,150,360.

According to the Dynamic Load Sharing protocol, a blocked link may be used if four requirements are satisfied. First, the blocked link must be a point-to-point connection between two bridges running the Dynamic Load Sharing protocol. Second, the Spanning Tree Protocol active path between the two bridges must pass through the root bridge. Third, the root bridge must run the Dynamic Load Sharing protocol. Fourth, the Spanning Tree Protocol cost between the two bridges must be greater than the direct Dynamic Load Sharing protocol link cost.

The Dynamic Load Sharing protocol forwards traffic to the blocked link under limited conditions. First, the traffic must arrive from "below" one of the two bridges according to the spanning tree, with the root bridge located at the top of the spanning tree. Second, the traffic must be destined to a station "below" the other of the two bridges. Therefore, the Dynamic Load Sharing protocol unnecessarily limits the blocked paths which can be used. Similarly, the effectiveness of the protocol relies upon the selection of a root bridge.

According to the Generalized Dynamic Load Sharing protocol, a blocked link may be used if the link is a point-to-point connection between two bridges running the Generalized Dynamic Load Sharing protocol. Traffic is forwarded across a blocked link upon a dynamic load balancing through an exchange of packets. Frames are sent on both the Generalized Dynamic Load Sharing link and the Spanning Tree Protocol link. Traffic is then sent along the link determined to be the fastest link. In this manner, traffic is dynamically reallocated through the shifting of addresses, unlike the Dynamic Load Sharing Protocol. Moreover, the need for a third bridge, such as the root bridge used in the Dynamic Load Sharing Protocol, is removed. However, two significant drawbacks exist with the Generalized Dynamic Load Sharing Protocol. First, determination of the fastest link through the sending of traffic is difficult to determine in high speed, bursty load environments. Second, the movement of addresses from one link to another creates a high risk of misordering frames.

Accordingly, it would be desirable to provide a method and system for using blocked links through a more reliable link determination mechanism, and a more reliable method for exchanging addresses. These advantages are achieved in an embodiment of the invention in which address tables are maintained for each bridge, and in which the fastest link is determined based upon port cost.

BRIEF DESCRIPTION OF THE INVENTION

The present invention provides a method and system for utilizing ports blocked by the Spanning Tree Protocol. According to a first aspect of the present invention, a method for determining which blocked links may be used including two steps. First, the blocked link must be a point-to-point connection between two bridges running shortcut trunking. A point-to-point connection might be indicated by a full-duplex connection between bridges. A point-to-point connection is a connection in which two bridges are direct neighbors and which have no intervening bridges. A full-duplex connection is one on which traffic may be passed in both directions simultaneously. This ensures that no loops will be created through intervening shared media. Second, on at least one of the two bridges, the port cost of the blocked link must be of equal or lower cost than the cost of the unblocked port linking the two devices via the STP reduced topology. This guarantees that the selected blocked link is not more expensive than the path through the Spanning Tree Protocol path.

According to a second aspect of the present invention, a method for determining which traffic may be forwarded across the blocked link includes several steps. First, each bridge builds a shortcut address list including each unicast address "outside" the bridge, relative to the shortcut and the active STP path between the two bridges. Second, the address lists are exchanged. Third, each bridge compares traffic arriving from "outside" to determine if the destination is on the shortcut list received from the other bridge. If it is, the traffic is forwarded on the shortcut.

The present invention creates a mesh-like topology, permitting traffic to travel through the shortest path in the mesh. This reduces latency for traffic forwarded on the shortcut created through the blocked path. Moreover, overall network performance is improved since traffic is more evenly distributed on network links.

DETAILED DESCRIPTION OF THE PREFERRED EMBODIMENTS

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

The present invention provides a method and system for utilizing blocked ports created by the Spanning Tree Protocol. Through the use of the present invention, a method for determining which blocked links may be used is provided. Moreover, a method for determining which traffic may be forwarded across the blocked link is set forth. These methods may be implemented in software or firmware, as well as in programmable gate array devices, ASIC and other hardware.

Figure 1:
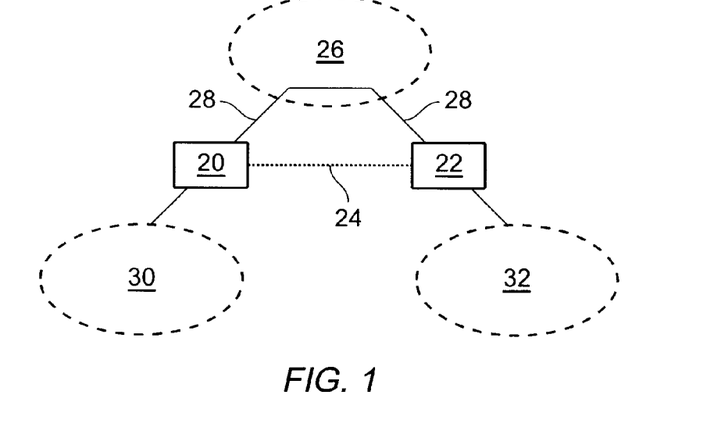
FIG. 1 is a block diagram of a network having two bridges connected by a blocked link.

Referring first to FIG. 1, a block diagram of a network having two bridges 20, 22 connected by a blocked link 24 is presented. Traffic having a source or destination address "within" the two bridges 26 must remain on the Spanning Tree Protocol enabled path 28. Traffic is "outside" the two bridges 26 if it is reachable only through these two bridges 26, and otherwise "inside" the two bridges 26. In addition, all broadcast, multicast and unknown destination traffic must traverse this Spanning Tree Protocol enabled path 28. Traffic "outside" the two bridges 30, 32 will benefit from using a shortcut provided by utilizing the blocked link 24 between the two bridges 20, 22. Specifically, directed traffic from anywhere in region 30 to anywhere in region 32, or from 32 to 30, may beneficially traverse 24 rather than 28. Although the invention is applied to bridges, the protocol is equally applicable to routers and other equivalent means.

Figure 2:
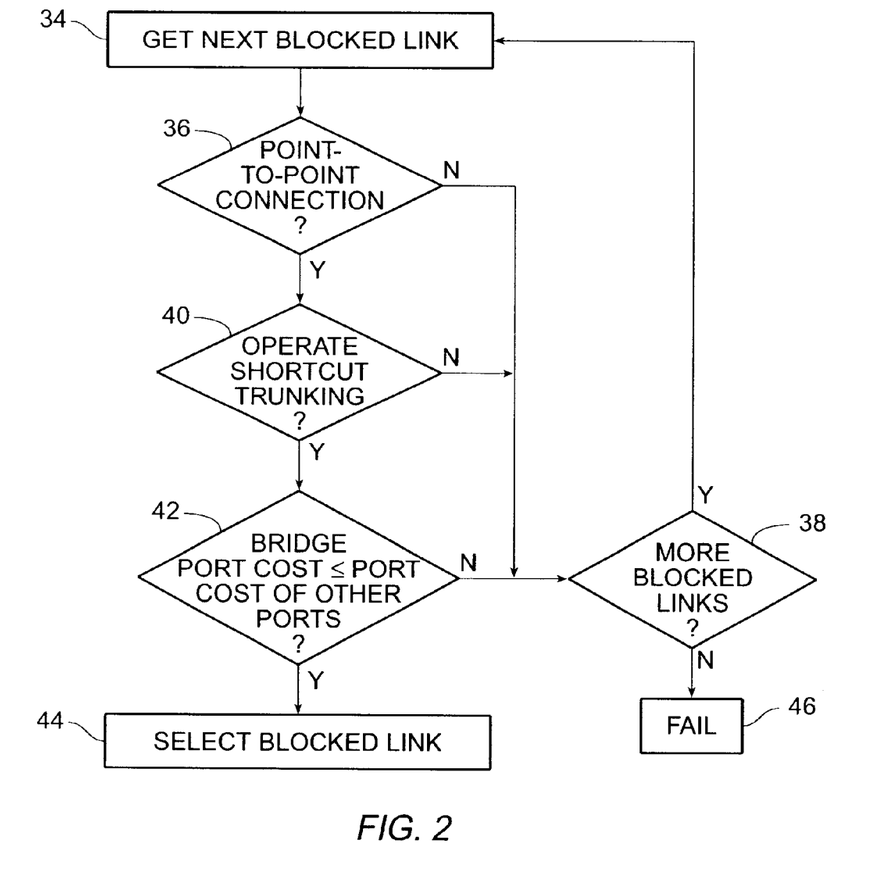
FIG. 2 illustrates a method for selecting a blocked link to allow forwarding of traffic on the blocked link according to a presently preferred embodiment of the present invention.

Referring now to FIG. 2, a method for selecting a blocked link to allow forwarding of traffic on the blocked link according to a presently preferred embodiment of the present invention is illustrated. At step 34, the next blocked link is found. At step 36, it is determined whether the blocked link is a point-to-point connection between two bridges, each one of the two bridges having a plurality of ports. If the blocked link is not a point-to-point connection between the two bridges, if it is determined that there are more blocked links at step 38, the next blocked link is analyzed at step 34. If it is determined that the blocked link is a point-to-point connection between two bridges, at step 40 it is ascertained whether each one of the two bridges operates a Shortcut Trunking Exchange protocol. If the two bridges do not operate the Shortcut Trunking Exchange protocol, if it is determined that there are more blocked links at step 38, the next blocked link is analyzed at step 34. If it is determined that the two bridges operate the Shortcut Trunking Exchange protocol, at step 42 it is calculated whether (on at least one of the two bridges), a port cost of the blocked link 24 is equal to or lower than a port cost of the spanning tree enabled connection port that leads to the spanning tree enabled path 28, on at least one of the two bridges.

If the port cost of the blocked link is equal or lower cost than all other port link costs, the blocked link is selected at step 44. (Because of the nature of the spanning tree protocol, the port cost of the blocked link is equal or lower cost than all other port link costs if the port cost is equal or lower than the port cost of the spanning tree enabled connection port that leads to the spanning tree enabled path 28.) If the port cost of the blocked link is not equal to or lower than all other port link costs, the next blocked link is analyzed at step 34 if it is determined that more blocked links exist at step 38. If no more blocked links are available, the selection process fails at step 46, and the traffic must be sent along the Spanning Tree Protocol enabled path. Those of ordinary skill in the art will readily recognize that the above steps are illustrative only and may be performed in an alternate order.

Figure 3:
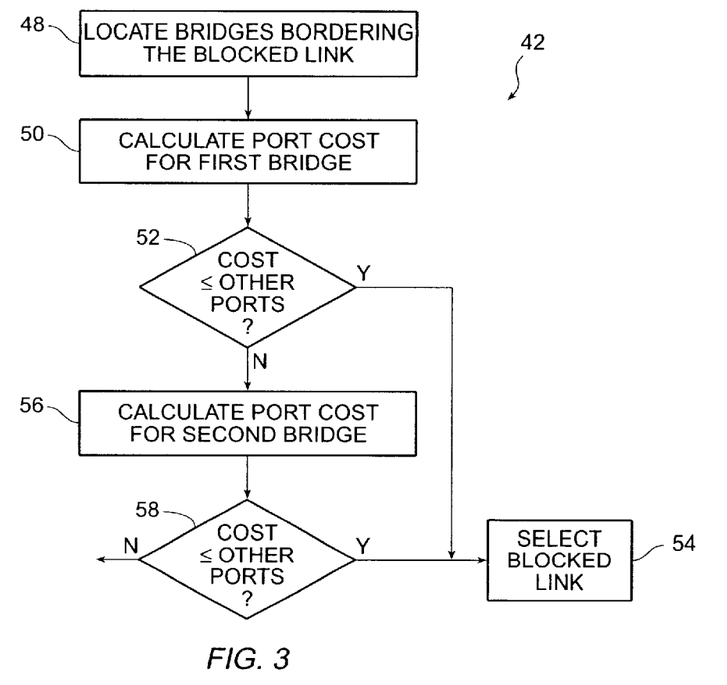
FIG. 3 illustrates the calculating step shown in FIG. 2 according to a presently preferred embodiment of the present invention.

Referring now to FIG. 3, the calculating step 42 of FIG. 2 according to a presently preferred embodiment of the present invention is illustrated. On at least one of the two bridges, the port cost of the blocked link must be of equal or lower cost than all other port link costs. For example, bridge protocol data units (BPDUs) are compared to determine which connection is the optimum connection. In a preferred embodiment, port cost has a default value, responsive to link speed, as specified in the IEEE 802.1D standard. It also may have been set to some other value by the user via management controls of the bridge.

At step 48, a first bridge and a second bridge bordering the blocked link are located, the first and second bridges each having a plurality of ports. Next, at step 50, a port cost of the blocked link is determined for the first bridge. Next, at step 52, it is determined for the first bridge whether the port cost of the blocked link is of equal or lower cost than the port cost of each other one of the plurality of first bridge ports. If the port cost is equal or lower, the blocked link is selected as a shortcut link, and the process ends at step 54. However, if the port cost is not equal or lower, the process continues.

At step 56, a port cost of the blocked link is determined for the second bridge. Next, at step 58, it is determined for the second bridge whether the port cost of the blocked link is of equal or lower cost than the port cost of each other one of the plurality of second bridge ports. If it is, the blocked link is selected as a shortcut link at step 54. However, if it is not, the blocked link cannot be used as a shortcut link.

Those of ordinary skill in the art will readily recognize that the above steps are illustrative only and may be performed in an alternative order. In a preferred embodiment, the first bridge and the second bridge each independently make their own determination of port link cost, and communicate their determinations to each other using a "discovery" packet in the STEP protocol; the discovery packet is communicated between the first bridge and the second bridge using the blocked link 24.

Figure 4:
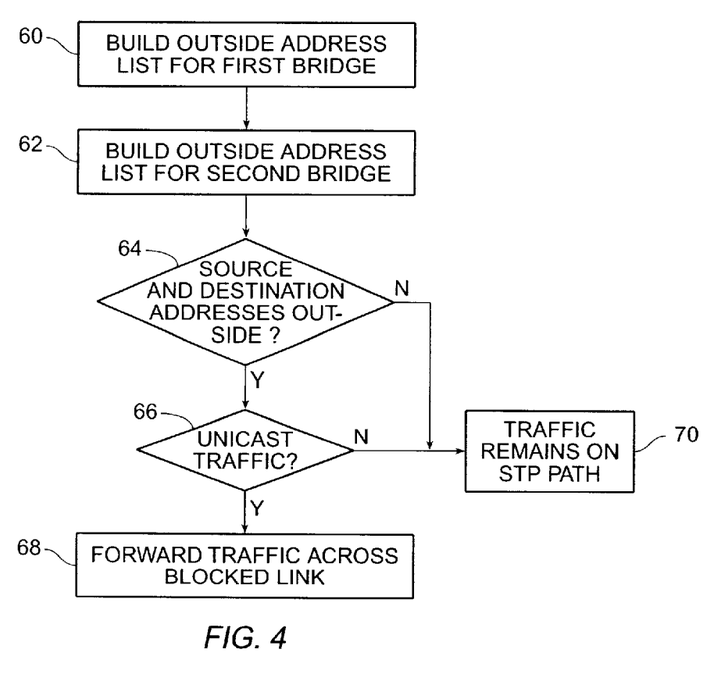
FIG. 4 illustrates a method for selecting traffic to forward on a blocked link according to a presently preferred embodiment of the present invention.

Once the blocked link 24 is selected for use as a shortcut link, selected traffic may be forwarded on the blocked link. Referring now to FIG. 4, a method for selecting traffic to forward on a blocked link according to a presently preferred embodiment of the present invention is presented. The traffic may be described as having both a source and a destination address. At step 60, an outside address list is built for a first bridge, the shortcut address list including each address "outside" the first bridge. Next, at step 62, an outside address list is built for a second bridge, the shortcut address list including each address "outside" the second bridge. Next, at step 64, it is determined whether the source and destination addresses are both "outside" the first and second bridges. This is performed using the outside address lists for the first and second bridges. If the source and destination addresses are both "outside" the first and second bridges, the traffic may be forwarded.

At step 66, it is determined that the traffic is unicast traffic, with a destination address for the traffic on the shortcut address list for the bridge (and arriving from an input interface other than the blocked link 24). If the traffic is broadcast or multicast, the traffic remains on the Spanning Tree Protocol active paths. If the traffic is unicast traffic with a destination address on the shortcut address list (and arrives from an input interface other than the blocked link 24), the traffic is forwarded across the blocked link 24 at step 68. In other instances, the traffic remains on the Spanning Tree Protocol enabled paths at step 70. Those of ordinary skill in the art will readily recognize that the above steps are illustrative only and may be performed in an alternative order.

Figure 5:
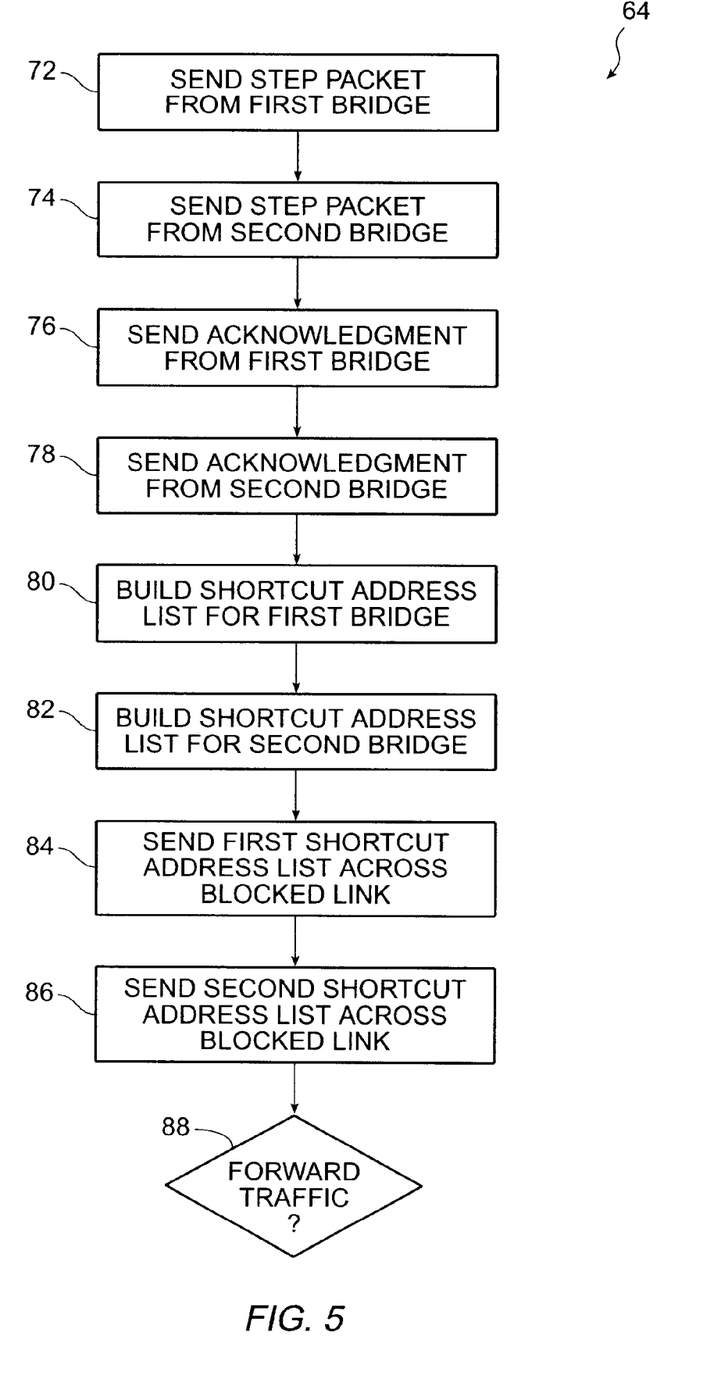
FIG. 5 illustrates a process for determining whether the source and destination addresses are both "outside" the first and second bridges according to a presently preferred embodiment of the present invention.

Referring now to FIG. 5, a process for determining whether the source and destination addresses are both "outside" the first and second bridges 64 as shown in FIG. 4 is presented. First, at step 72, a Shortcut Trunking Exchange protocol packet is sent from the first bridge out every Spanning Tree Protocol enabled port of the first bridge to learn which Spanning Tree Protocol enabled port leads to the second bridge. Next, at step 74, a Shortcut Trunking Exchange protocol packet is sent from the second bridge out every Spanning Tree Protocol enabled port of the second bridge to learn which Spanning Tree Protocol enabled port leads to the first bridge. Next, at step 76, an acknowledgment is sent through the blocked link from the first bridge. Similarly, at step 78, an acknowledgment is sent through the blocked link from the second bridge.] A shortcut address list for the first bridge is built at step 80, the shortcut address list including all addresses on all ports except the Spanning Tree Protocol enabled port leading to the second bridge. Next, at step 82, a shortcut address list for the second bridge is built, the shortcut address list again including all addresses on all ports except the Spanning Tree Protocol enabled port leading to the first bridge. Next, at step 84, the shortcut address list for the first bridge is sent across the blocked link. Next, at step 86, the shortcut address list for the second bridge is sent across the blocked link. The addresses specified in the shortcut address lists are those between which traffic is to be forwarded through the shortcut. Therefore, at step 88, the shortcut address lists for the first and second bridges are ultimately used to determine whether traffic should be forwarded across the blocked link. Those of ordinary skill in the art will readily recognize that the above steps are illustrative only and may be performed in an alternate order.

Figure 6:
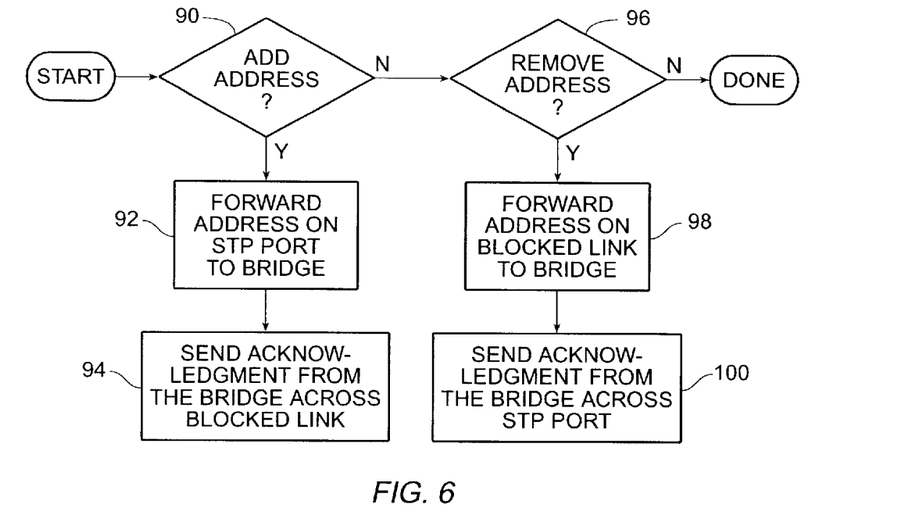
FIG. 6 illustrates a method for updating shortcut address lists according to a presently preferred embodiment of the present invention.

Referring now to FIG. 6, a method for updating shortcut address lists according to a presently preferred embodiment of the present invention is presented. At step 90, an address may be added to the shortcut address list for the first bridge. In a preferred embodiment, the address is added by forwarding the address along the shortcut port leading to the second bridge at step 92.

Forwarding all such addresses has the advantage that little additional control traffic is added to the spanning tree paths of the network. However, in alternative embodiments, addresses may be added by one of the following techniques:

A complete list of shortcut addresses is built periodically by the bridge;

A complete list of shortcut addresses is sent periodically to the bridge;

A set of changes to the list of shortcut addresses is sent periodically to the bridge;

A message regarding shortcut addresses sent to the bridge may be optionally acknowledged by the bridge; or A list of shortcut addresses at the bridge may be aged according to known techniques for aging destination addresses in a network topology.

An acknowledgment is sent from the second bridge across the blocked link to the first bridge at step 94. Similarly, at step 96, an address may be removed from the shortcut address list for the first bridge. According to a presently preferred embodiment of the present invention, the address to be removed is removed by forwarding the address along the blocked link to the second bridge at step 98. Next, at step 100, an acknowledgment is sent from the second bridge to the first bridge along the Spanning Tree Protocol enabled port leading to the first bridge. These steps may similarly be performed for each bridge in the network. Those of ordinary skill in the art will readily recognize that the above steps are illustrative only and may be performed in an alternate order.

Figure 7:
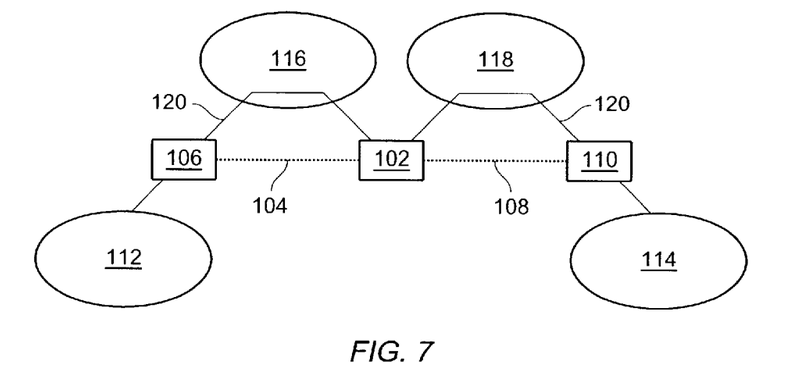
FIG. 7 is a block diagram of a bridge having more than one link useful as a shortcut link.

Referring now to FIG. 7, a block diagram of a bridge 102 having more than one link useful as a shortcut link is presented. As shown, the bridge 102 has two possible shortcut links. A first shortcut link 104 connects the bridge 102 to a first shortcut bridge 106, while the second shortcut link 108 connects the bridge 102 to a second shortcut bridge 110. Each one of the shortcut bridges 106, 110 will provide a shortcut address list of addresses which will use a selected shortcut. The shortcut address list for each shortcut bridge will include addresses on the "outside" of the corresponding shortcut bridge. As illustrated in FIG. 7, the shortcut address list for the first shortcut bridge will include addresses of bridges and devices "outside" the first shortcut bridge 112. For example, the first shortcut bridge 106 will provide its shortcut address list over to the bridge 102, which then forwards traffic arriving from the second shortcut bridge 110 and which matches these addresses along the first shortcut link 104. Similarly, the shortcut address list for the second shortcut bridge 110 will include addresses of bridges and devices "outside" the second shortcut bridge 114. For example, the second shortcut bridge 110 will provide its shortcut address list over to the bridge 102, which then forwards traffic arriving from the first shortcut bridge 106 and which matches these addresses along the second shortcut link 108. Traffic originating from or destined for an address which lies "inside" the first and second shortcut bridges 116, 118 must remain on the STP path 120.

In order to determine which shortcut link should be selected as the shortcut, the STP enabled port from the bridge directed toward each shortcut bridge is considered. If the STP enabled port directed to the first shortcut bridge and the second shortcut bridge are distinct, the first and second shortcut links can operate independently, and the corresponding shortcut lists are similarly distinct. However, if the STP enabled port directed to the first shortcut bridge and the second shortcut bridge are identical, the corresponding shortcut lists may contain overlapping addresses. Therefore, it is useful that a mechanism be provided to determine which one of the shortcut links to use for addresses requested by both the first shortcut bridge and the second shortcut bridge. If no mechanism is provided, indeterminacy may be handled by forwarding only on the STP paths in such cases.

Figure 8:
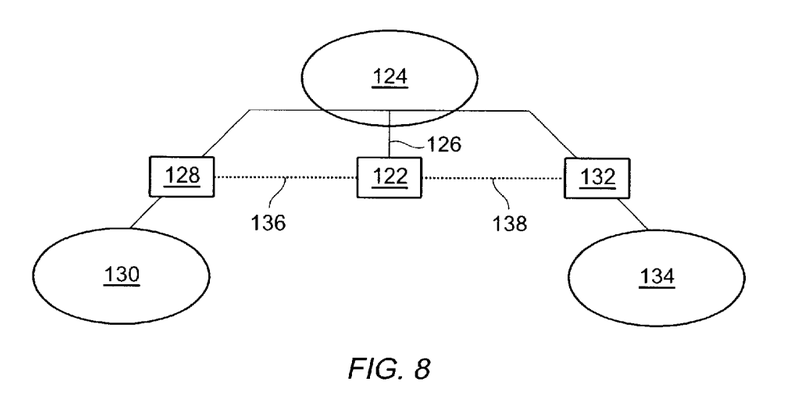
FIG. 8 is a block diagram of a bridge having more than one shortcut bridge reachable via a single Spanning Tree Protocol enabled port.

Referring now to FIG. 8, a block diagram of a bridge having more than one shortcut bridge reachable via a single Spanning Tree Protocol enabled port is presented. A bridge 122 has addresses 124 reachable through an STP port 126. A first shortcut bridge 128 has a shortcut address list 130 containing addresses "outside" the first shortcut bridge. In addition, a second shortcut bridge 132 has a shortcut address list 134 containing addresses "outside" the second shortcut bridge. As shown, the addresses contained in the shortcut address list 130 corresponding to the first shortcut bridge 128 and the addresses contained in the shortcut address list 134 corresponding to the second shortcut bridge 132 do not overlap. Thus, the two shortcuts 136, 138 can operate independently, as shown in FIG. 7.

Figure 9:
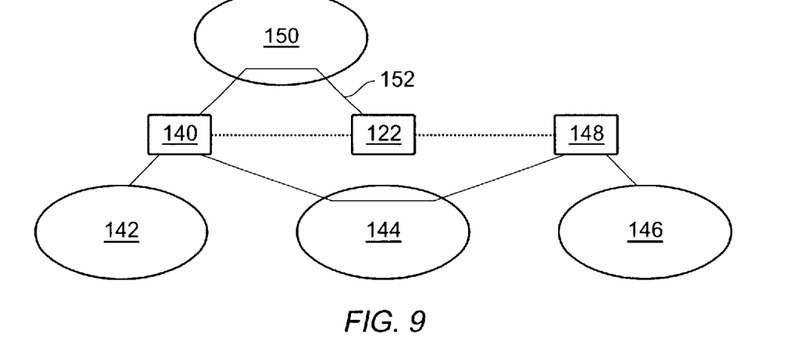
FIG. 9 is a block diagram illustrating two shortcut bridges reachable via a single Spanning Tree Protocol enabled port and having overlapping address lists.

Referring now to FIG. 9, a block diagram illustrating two shortcut bridges reachable via a single Spanning Tree Protocol enabled port and having overlapping address lists is presented. A first shortcut bridge 140 has a shortcut address list containing addresses "outside" the first shortcut bridge. As shown, the shortcut address list corresponding to the first shortcut bridge will contain bridge and device addresses corresponding to a first group 142, a second group 144, and a third group 146 of addresses. A second shortcut bridge 148 has a shortcut address list containing addresses "outside" the second shortcut bridge. The shortcut address list corresponding to the second shortcut bridge will contain bridge and device addresses corresponding to the third group 146 of addresses, as shown. Source and destination addresses 150 not falling "outside" the first 140 and second 148 shortcut bridges are sent along the STP path 152.

Figure 10:
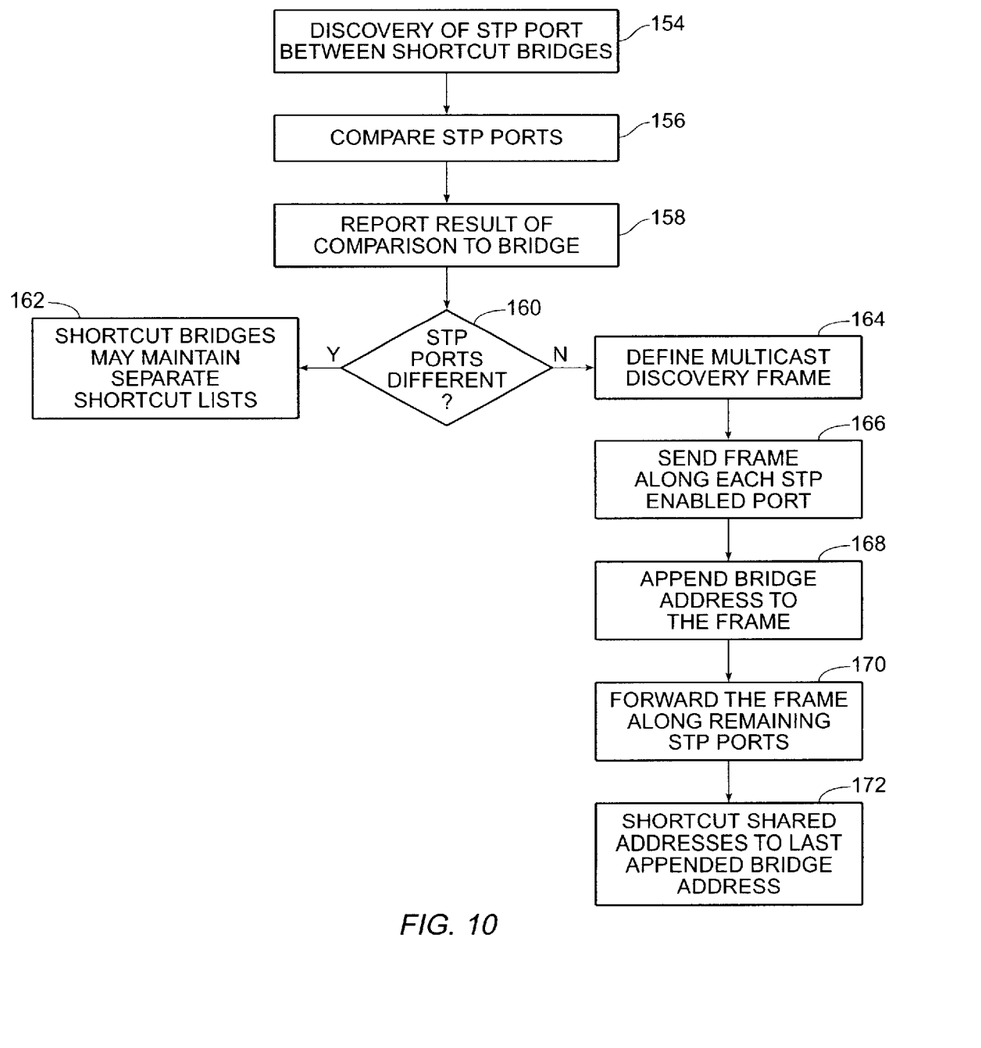
FIG. 10 illustrates a method for determining which shortcut link to use for addresses requested by one or both of two shortcut bridges according to a presently preferred embodiment of the present invention.

Referring now to FIG. 10, a method for determining which shortcut link to use for addresses requested by one or both of the two shortcut bridges according to a presently preferred embodiment of the present invention is presented. First, at step 154, the bridge asks each of the two shortcut bridges to "discover" an STP enabled port between the two shortcut bridges. At step 156, a comparison between the STP enabled port from each of the two shortcut bridges to the other of the two shortcut bridges and the STP enabled port from each of the two shortcut bridges to the bridge is performed. At step 158, each of the two shortcut bridges reports to the bridge whether the STP enabled port to the other of the two shortcut bridges is the same as the STP enabled port to the bridge. At step 160, if the STP enabled ports in step 158 are determined to be different, the two shortcut bridges may maintain separate shortcut lists at step 162. However, if at step 160, the STP enabled ports of step 158 are determined to be identical, a process for determining which one of the shortcut links to use for overlapping addresses is followed. At step 164, a multicast discovery frame is defined by the bridge. At step 166, the multicast discovery frame is then sent along each STP enabled path via each Shortcut Trunking Exchange protocol enabled bridge within the network. Thus, the multicast discovery frame is received by each Shortcut Trunking Exchange protocol enabled bridge. Next, at step 168, each Shortcut Trunking Exchange protocol enabled bridge within the network appends its bridge address to the multicast discovery frame. Next, at step 170, the multicast discovery frame is forwarded along each remaining STP enabled port within the Shortcut Trunking Exchange protocol enabled bridge. These steps are repeated until the multicast discovery frame has been sent along each bridge. Thus, any addresses requested by both the first shortcut bridge and the second shortcut bridge are shortcutted to the shortcut bridge address lowest on the list of addresses contained in the multicast discovery frame at step 172, since this shortcut bridge is furthest from the bridge. Those of ordinary skill in the art will readily recognize that the above steps are illustrative only and may be performed in an alternate order.

Through application of the present invention, a mesh-like topology may be created, allowing traffic to travel through the shortest path in the mesh. This reduces latency for traffic forwarded on the shortcut created through the blocked path. Moreover, overall network performance is improved since traffic is more evenly distributed throughout the network.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for enabling a blocked link to allow forwarding of traffic on the blocked link, the method including the following steps:

determining whether the blocked link is a point-to-point connection between two bridges, each one of the two bridges having a plurality of ports; and ascertaining whether each one of the two bridges operates a Shortcut Trunking Exchange protocol; and calculating whether on at least one of the two bridges, a port cost of the blocked link is equal to or lower than a port cost of each other one of the plurality of ports.

2. The method according to claim 1, wherein the calculating step includes the following sub-steps:

locating a first bridge and a second bridge bordering the blocked link, the first and second bridges each having a plurality of ports;

determining for the first bridge a port cost of the blocked link; and determining for the first bridge whether the port cost of the blocked link is of equal or lower cost than the port cost of a port for a spanning tree path connection between the bridges.

3. The method according to claim 2, wherein the calculating step includes the following sub-steps:

determining for the second bridge a port cost of the blocked link; and determining for the second bridge whether the port cost of the blocked link is of equal or lower cost than the port cost of a port for a spanning tree path connection from the second bridge to a spanning tree root node.

4. A method for selecting traffic to forward on a blocked link, the traffic having a source and a destination address, the method including the following steps:

building an outside address list for a first bridge, the outside address list including each address "outside" the first bridge;

building an outside address list for a second bridge, the outside address list including each address "outside" the second bridge;

determining that the input interface and destination address are both "outside" the first and second bridges using the outside address lists for the first and second bridges; and forwarding unicast traffic when the input interface and destination address are both "outside" the first and second bridges.

5. The method according to claim 4, wherein the determining step includes the following sub-steps:

sending from the first bridge a Shortcut Trunking Exchange protocol packet out every Spanning Tree Protocol enabled port of the first bridge to learn which Spanning Tree Protocol enabled port leads to the second bridge;

sending from the second bridge a Shortcut Trunking Exchange protocol packet out every Spanning Tree Protocol enabled port of the second bridge to learn which Spanning Tree Protocol enabled port leads to the first bridge;

sending an acknowledgment through the blocked link from the first bridge;

sending an acknowledgment through the blocked link from the second bridge;

building a shortcut address list for the first bridge based upon the outside address list for the first bridge, the shortcut address list excluding the Spanning Tree Protocol enabled port leading to the second bridge;

building a shortcut address list for the second bridge based upon the outside address list for the second bridge, the shortcut address list excluding the Spanning Tree Protocol enabled port leading to the first bridge;

sending the shortcut address list for the first bridge across the blocked link;

sending the shortcut address list for the second bridge across the blocked link; and using the shortcut address lists for the first and second bridges to determine whether traffic should be forwarded across the blocked link.

6. The method according to claim 5, the method including the following sub-step:

adding an address to the shortcut address list for the first bridge.

7. The method according to claim 6, wherein the adding step includes the following sub-steps:

forwarding the address along the Spanning Tree Protocol enabled port leading to the second bridge; and sending an acknowledgment from the second bridge across the blocked link to the first bridge.

8. The method according to claim 5, the method including the following step:

replacing an address from the shortcut address list for the first bridge with an received address for said shortcut address list.

9. The method according to claim 8, wherein the removing step includes the following sub-steps:

forwarding the address along the shortcut to the second bridge; and sending an acknowledgment from the second bridge to the first bridge along the Spanning Tree Protocol enabled port leading to the first bridge.

10. A method for selecting one of two blocked links within a network, the two blocked links including a first shortcut link and a second shortcut link, the first shortcut link bordered by a bridge and a first shortcut bridge, the second shortcut link bordered by the bridge and a second shortcut bridge, the method including the following steps:

discovering an STP enabled port between the two shortcut bridges;

reporting from the first shortcut bridge to the bridge whether the STP enabled port between the two shortcut bridges is identical to an STP enabled port from the first shortcut bridge to the bridge;

reporting from the second shortcut bridge to the bridge whether the STP enabled port between the two shortcut bridges is identical to an STP enabled port from the second shortcut bridge to the bridge; and selecting one of the two shortcut links when the first shortcut bridge reporting step and the second shortcut bridge reporting step indicate that the STP enabled port between the two shortcut bridges is identical to the STP enabled port from the first shortcut bridge to the bridge and identical to the STP enabled port from the second shortcut bridge to the bridge.

11. The method according to claim 10, wherein the selecting step includes the following sub-steps:

defining a multicast discovery frame;

sending the multicast discovery frame along each STP enabled path via a Shortcut Trunking Exchange protocol enabled bridge within the network;

appending a bridge address to the multicast discovery frame;

forwarding the multicast discovery frame along each remaining STP enabled port within the Shortcut Trunking Exchange protocol enabled bridge; and shortcutting addresses requested by the first shortcut bridge and the second shortcut bridge to a bridge corresponding to an address list appended to the multicast discovery frame.

12. An apparatus for enabling a blocked link to allow forwarding of traffic on the blocked link, including:

means for determining whether the blocked link is a point-to-point connection between two bridges, each one of the two bridges having a plurality of ports; and means for ascertaining whether each one of the two bridges operates a Shortcut Trunking Exchange protocol; and means for calculating whether on at least one of the two bridges, a port cost of the blocked link is equal to or lower than a port cost of a port for a spanning tree path connection between the bridges.

13. The apparatus according to claim 12, wherein the means for calculating includes:
   means for locating a first bridge and a second bridge bordering the blocked link, the first and second bridges each having a plurality of ports;
   means for determining for the first bridge a port cost of the blocked link; and
   means for determining for the first bridge whether the port cost of the blocked link is of equal or lower cost than the port cost of a port for a spanning tree path connection between the said first bridge and a spanning tree root node.

14. The apparatus according to claim 13, wherein the means for calculating includes:
   means for determining for the second bridge a port cost of the blocked link; and
   means for determining for the second bridge whether the port cost of the blocked link is of equal or lower cost than the port cost of a port for a spanning tree path to a spanning tree root node.

15. An apparatus for selecting traffic to forward on a blocked link, the traffic having a source and a destination address, the apparatus including:
   means for building an outside address list for a first bridge, the outside address list including each address "outside" the first bridge;
   means for building an outside address list for a second bridge, the outside address list including each address "outside" the second bridge;
   means for determining that the source and destination addresses are both "outside" the first and second bridges using the outside address lists for the first and second bridges; and
   means for forwarding the traffic if the traffic is unicast traffic when the source and destination addresses are both "outside" the first and second bridges.

16. The apparatus according to claim 15, wherein the means for determining includes:
   means for sending from the first bridge a Shortcut Trunking Exchange protocol packet out every Spanning Tree Protocol enabled port of the first bridge to learn which Spanning Tree Protocol enabled port leads to the second bridge;
   means for sending from the second bridge a Shortcut Trunking Exchange protocol packet out every Spanning Tree Protocol enabled port of the second bridge to learn which Spanning Tree Protocol enabled port leads to the first bridge;
   means for sending an acknowledgment through the blocked link from the first bridge;
   means for sending an acknowledgment through the blocked link from the second bridge;
   means for building a shortcut address list for the first bridge based upon the outside address list for the first bridge, the shortcut address list excluding the Spanning Tree Protocol enabled port leading to the second bridge;
   means for building a shortcut address list for the second bridge based upon the outside address list for the second bridge, the shortcut address list excluding the Spanning Tree Protocol enabled port leading to the first bridge;
   means for sending the shortcut address list for the first bridge across the blocked link;
   means for sending the shortcut address list for the second bridge across the blocked link; and
   means for using the shortcut address lists for the first and second bridges to determine whether traffic should be forwarded across the blocked link.

17. The apparatus according to claim 16, the apparatus including means for adding an address to the shortcut address list for the first bridge.

18. The apparatus according to claim 17, wherein the means for adding includes:
   means for forwarding the address along the Spanning Tree Protocol enabled port leading to the second bridge; and
   means for sending an acknowledgment from the second bridge across the blocked link to the first bridge.

19. The apparatus according to claim 16, the apparatus including means for removing an address from the shortcut address list for the first bridge.

20. The apparatus according to claim 19, wherein the means for removing includes:
   means for forwarding the address along the shortcut to the second bridge; and
   means for sending an acknowledgment from the second bridge to the first bridge along the Spanning Tree Protocol enabled port leading to the first bridge.

21. An apparatus for selecting one of two blocked links within a network, the two blocked links including a first shortcut link and a second shortcut link, the first shortcut link bordered by a bridge and a first shortcut bridge, the second shortcut link bordered by the bridge and a second shortcut bridge, the apparatus including
   means for discovering an STP enabled port between the two shortcut bridges;
   means for reporting from the first shortcut bridge to the bridge whether the STP enabled port between the two shortcut bridges is identical to an STP enabled port from the first shortcut bridge to the bridge;
   means for reporting from the second shortcut bridge to the bridge whether the STP enabled port between the two shortcut bridges is identical to an STP enabled port from the second shortcut bridge to the bridge; and
   means for selecting one of the two shortcut links when the first shortcut bridge reporting step and the second shortcut bridge reporting step indicate that the STP enabled port between the two shortcut bridges is identical to the STP enabled port from the first shortcut bridge to the bridge and identical to the STP enabled port from the second shortcut bridge to the bridge.

22. The apparatus according to claim 21, wherein the means for selecting includes the following:
   means for defining a multicast discovery frame;
   means for sending the multicast discovery frame along each STP enabled path via a Shortcut Trunking Exchange protocol enabled bridge within the network;
   means for appending a bridge address to the multicast discovery frame;
   means for forwarding the multicast discovery frame along each remaining STP enabled port within the Shortcut Trunking Exchange protocol enabled bridge; and
   means for shortcutting addresses requested by the first shortcut bridge and the second shortcut bridge to a bridge corresponding to an address last appended to the multicast discovery frame.

23. A method for routing traffic across a blocked link, the traffic having a source and a destination address, the method including the following steps:

determining whether the blocked link is a point-to-point connection between two bridges, each one of the two bridges having a plurality of ports; and ascertaining whether each one of the two bridges operates a Shortcut Trunking Exchange protocol;

calculating whether on at least one of the two bridges, a port cost of the blocked link is equal to or lower than a port cost of a port for a spanning tree path;

building an outside address list for a first bridge, the outside address list including each address "outside" the first bridge;

building an address list for a second bridge, the outside address list including each address "outside" the second bridge;

determining that the source and destination addresses are both "outside" the first and second bridges using the outside address lists for the first and second bridges; and forwarding the traffic if the traffic is unicast traffic when the source and destination addresses are both "outside" the first and second bridges.

24. An apparatus for routing traffic across a blocked link, the traffic having a source and a destination address, including:

means for determining whether the blocked link is a point-to-point connection between two bridges, each one of the two bridges having a plurality of ports; and means for ascertaining whether each one of the two bridges operates a Shortcut Trunking Exchange protocol;

means for calculating whether on at least one of the two bridges, a port cost of the blocked link is equal to or lower than a port cost of a port for a spanning tree path;

means for building an outside address list for a first bridge, the outside address list including each address "outside" the first bridge;

means for building an outside address list for a second bridge, the outside address list including each address "outside" the second bridge;

means for determining that the source and destination addresses are both "outside" the first and second bridges using the outside address lists for the first and second bridges; and means for forwarding the traffic if the traffic is unicast traffic when the source and destination addresses are both "outside" the first and second bridges.

25. A method for routing traffic in a network having a spanning tree, said spanning tree including a plurality of nodes in said network and a plurality of links coupling pairs of said nodes, said plurality of nodes including a root node and at least one non-root node, said plurality of links forming a path coupling each non-root node to said root node, and said plurality of links forming a path coupling a first said non-root node to a second said non-root node through said route node, said spanning tree including substantially all nodes in said network and excluding a set of links in said network, said method including steps for determining a set of shortcut routes for said network, each said shortcut route including at least one link excluded from said spanning tree, each said shortcut route having a set of shortcut destinations associated therewith, said set of shortcut routes excluding a closed loop of links, whereby messages routed within a union of said spanning tree and said set of shortcut routes are not returned in a closed loop to a point of origin.

26. A method as in claim 25, wherein said steps for determining include selecting a set of shortcut routes, each said shortcut route including at least one link excluded from said spanning tree;

associating a set of shortcut destinations with each said shortcut route, wherein said steps for associating include steps for transmitting a list of shortcut destinations to a node coupled to said shortcut route.

27. A method as in claim 26, wherein said steps for transmitting are performed substantially periodically; and said list of shortcut destinations includes a substantially complete list.

28. A method as in claim 26, wherein said steps for transmitting are performed substantially periodically; and said list of shortcut destinations includes a set of updates.

29. A method as in claim 26, wherein said steps for associating include steps for, at least one said node coupled to said shortcut route, aging said shortcut destinations.

* * * * *